United States Patent [19]

Christiansen et al.

[11] Patent Number: 4,568,111

[45] Date of Patent: Feb. 4, 1986

[54] DETACHABLE CONNECTION FOR A NUCLEAR REACTOR FUEL ASSEMBLY

[75] Inventors: David W. Christiansen, Kennewick; Richard A. Karnesky, Richland, both of Wash.

[73] Assignee: The United States of America as represented by the United States Department of Energy, Washington, D.C.

[21] Appl. No.: 527,547

[22] Filed: Aug. 29, 1983

[51] Int. Cl.$^4$ .......................... F16L 37/12; G21C 3/06
[52] U.S. Cl. ...................................... 285/92; 285/319; 285/323; 376/446
[58] Field of Search ............... 376/362, 364, 446, 448; 285/305, 308, 319, 390, 92, 323

[56] References Cited

U.S. PATENT DOCUMENTS

| | | |
|---|---|---|
| 3,249,505 | 5/1966 | Laurent et al. ..................... 376/364 |
| 3,802,996 | 4/1974 | Jones . |
| 4,348,353 | 9/1982 | Christiansen et al. .............. 376/364 |
| 4,366,166 | 12/1982 | Christiansen et al. .............. 376/446 |
| 4,477,104 | 10/1984 | Akkerman ........................... 285/319 |

*Primary Examiner*—Charles T. Jordan
*Assistant Examiner*—Richard Klein
*Attorney, Agent, or Firm*—Edward W. Nypaver; Robert Southworth, III; Judson R. Hightower

[57] ABSTRACT

A locking connection for releasably attaching a handling socket to the duct tube of a fuel assembly for a nuclear reactor. The connection comprises a load pad housing mechanically attached to the duct tube and a handling socket threadably secured within the housing. A retaining ring is interposed between the housing and the handling socket and is formed with a projection and depression engageable within a cavity and groove of the housing and handling socket, respectively, to form a detachable interlocked connection assembly.

10 Claims, 4 Drawing Figures

DETACHABLE CONNECTION FOR A NUCLEAR REACTOR FUEL ASSEMBLY

The United States Government has rights in this invention pursuant to Contract No. DE-AC06-76FF02170 between the U.S. Department of Energy and the Westinghouse Electric Corporation.

BACKGROUND OF THE INVENTION

The present invention relates generally to fuel assemblies and, more particularly, to a detachable connection for attaching a handling socket to the duct tube or housing of a fuel assembly.

The reactor core of a typical nuclear reactor is designed to sustain a continuous sequence or chain of fission reactions, and generally contains a multiplicity of similarly constructed and interchangeable fuel assemblies vertically oriented in a side-by-side relation. Each fuel assembly, in turn, contains a multiplicity of thin, elongated fuel elements or pins containing fissionable material, such as uranium, thorium, and/or plutonium for example. As is known, the heat generated by the fission reactions is transferred to a coolant, such as liquid sodium for example, and subsequently transmitted to a secondary coolant, such as water, for conversion into steam for generating electrical energy.

In addition to the multiplicity of fuel pins, each fuel assembly usually comprises a relatively thin-walled duct tube serving as the jacket or housing for the fuel pins as well as a conduit for the passage of coolant therethrough, a shield/inlet nozzle assembly for introducing the coolant into the fuel assembly, and a handling socket at the other end of the duct tube to facilitate insertion and removal of the assembly into and from the core. Each fuel assembly must maintain its structural integrity during various stages of reactor operation including heat-up, cool-down, shut-down and powered operations as well as withstand the most adverse operative conditions expected during its lifetime.

Each of the fuel elements or pins is comprised of a plurality of uranium or plutonium oxide cylindrical fuel pellets, stacked end-to-end within a thin-walled tube or cladding provided with a spring loaded plenum at one end thereof and sealed at its opposite end with an end cap or plug. The fuel pin cladding is formed of a metallic alloy having good neutron economy, i.e., low neutron cross section and capable of withstanding the adverse effects of thermal cycling, corrosion, irradiation and thermal creep, and irradiation induced changes in material properties.

The duct tubes serve as the axial and lateral fuel assembly support and provide for coolant flow separation between fuel assemblies. As in the case of the fuel pins, the duct tubes also are formed of a special metallic alloy designed to withstand the deleterious effects encountered in a high temperature irradiation environment. The fuel assemblies are vertically oriented in the core and, in order to provide structural continuity therefor, are provided at their lower ends with shield/inlet nozzle assemblies, respectively, and at their upper ends with handling sockets, respectively.

The shield/inlet nozzle assembly allows coolant to enter the fuel assembly while providing neutron shielding. It structurally ties the fuel pins to a support member and normally is welded to the duct tube to provide overall structural integrity for the fuel assembly.

The handling socket allows the coolant to exit the fuel assembly and, like the inlet/nozzle assembly, is normally welded to the duct tube for structural integrity. The handling socket permits manipulation of the fuel asembly and facilitates attachment of grappling devices or hoists thereto for ease of insertion into and removal from the reactor core.

Because of the severe hostile conditions to which fuel assemblies are exposed to in service, they are periodically removed from the core for internal inspection, testing and maintenance, or for fuel pin replacement upon failure thereof. Where prior art fabrication methods employed weldments to attach the handling socket to the duct tube, it can be appreciated that destructive techniques were required to separate the socket from the duct tube with resultant loss of expensive components and materials. Thus, it was found desirable to mechanically attach the socket to the duct tube to realize nondestructive separation of the handling socket from the duct tube for reuse as part of reconstituted fuel assemblies.

Attempts have been made along these lines by utilizing mechanically detachable elements for connecting the handling socket to the duct tube. While these efforts have resulted in attachment assemblies that have admirably served their purpose, they haven't been entirely satisfactory in all cases. For example, one mechanically removable handling socket arrangement utilizes a transition ring that is welded to the duct tube to obtain adequate structural support and remains an integral part thereof. Even though the handling socket can be readily removed for access into the duct tube, the transition ring now forming a permanent part of the duct tube precludes fuel pin removal equipment access to certain fuel pins. Accordingly, failed fuel pins residing in this nonaccessible area cannot be replaced and the otherwise reuseable duct tube must be scrapped. Also, the insertion of the transition ring in the duct tube creates a small crevice that cannot be demonstrated to be completely free of sodium after the cleansing operation. Consequently, total fuel pin reconstitution, which requires a thorough cleansing of all sodium from within the fuel assembly, cannot be performed and weld joint structural integrity could be compromised due to caustic stress corrosion cracking.

Accordingly, it is a primary object of the present invention to overcome the above noted shortcomings by providing an improved connection assembly for releasably attaching a handling socket to a fuel assembly duct tube.

It is another object of this invention to provide a detachable handling socket for a fuel assembly duct tube which can be readily and nondestructively dismantled for reuse and which affords complete and unobstructed access into the interior thereof.

It is a further object of the present invention to provide a novel detachable handling socket-duct tube connection incorporating separable retaining means for securing the components together in an interlocked assembled relation.

It is still a further object of the present invention to provide nondestructive removal of a handling socket from a duct tube to facilitate internal inspection, testing, maintenance, fuel pin replacement and total fuel assembly reconstitution for reuse.

SUMMARY OF THE INVENTION

A connection assembly is provided for releasably attaching a handling socket to the duct tube of a nuclear fuel assembly. The connection assembly includes a load pad housing mechanically attached to the duct tube, a handling socket threadably secured within the housing, and a retaining ring interposed between the socket and the housing and formed with locking means engageable with the socket and the housing for securing the same, along with the retaining ring, in an interlocked assembled relation.

DESCRIPTION OF THE PREFERRED EMBODIMENT

Figure 1:
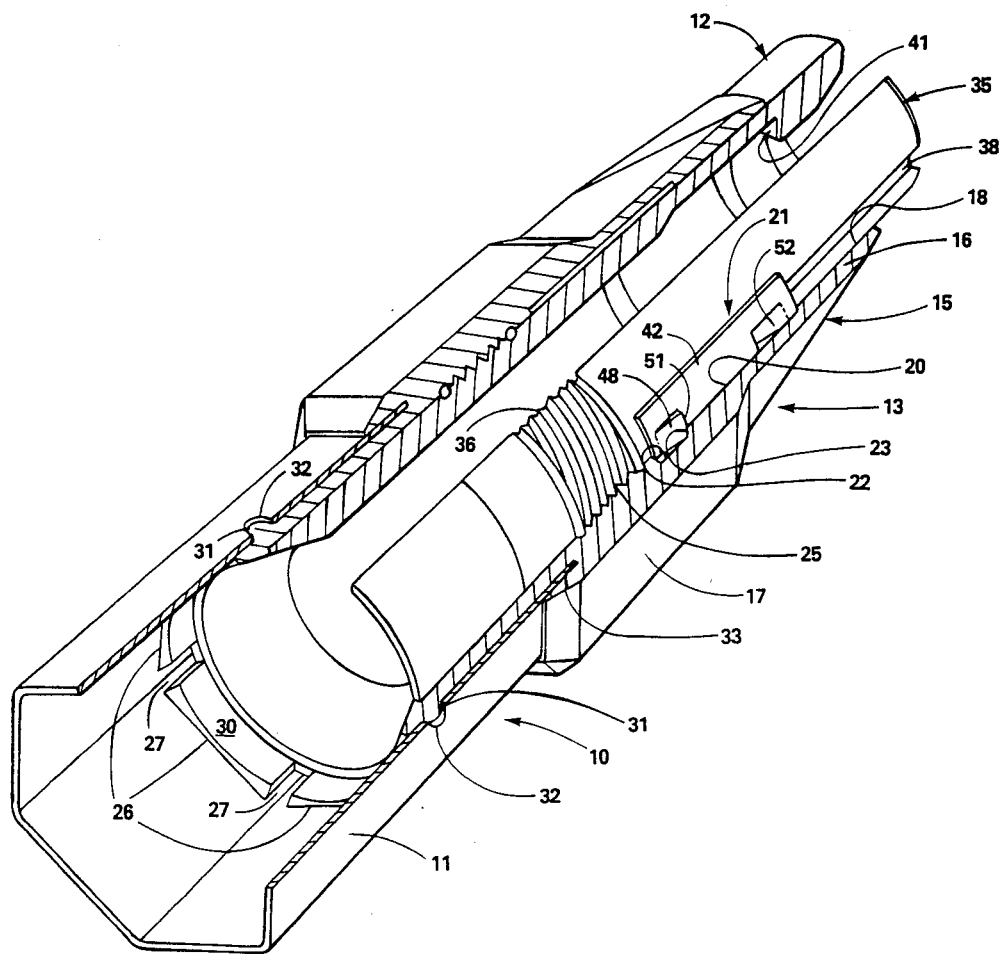
FIG. 1 is a fragmentary perspective view, partly in section, of the handling socket-duct tube connection assembly constructed in accordance with this invention and with portions broken away for the sake of clarity.

Referring now in detail to the illustrative embodiment depicted in the accompanying drawings, there is shown in FIG. 1 the upper portion of a fuel assembly, comprehensively designated 10, comprising the upper end of a duct tube 11 and a handling socket 12 rigidly but detachably secured thereto by connection means in the form of an attachment system or assembly 13 constructed in accordance with this invention. The lower end of the duct tube 11 is suitably attached to a shield-/inlet nozzle assembly (not shown) as is well known in the art. As used herein, the terms upper, lower top, bottom, vertical, horizontal and the like are applied only for convenience of description with reference to FIG. 2 and should not be taken as limiting the scope of this invention.

The duct tube 11 is formed of a special alloy, such as cold worked AISI 316 steel for example, or any other suitable alloy designed to withstand the deleterious effects of thermal cycling, corrosion, irradiation and thermal creep in high temperature, irradiation environments. The duct tube 11 preferably has a generally hexagonal configuration in cross section and serves as a jacket or housing for a multiplicity of elongated fuel elements or pins (not shown) contained therein. The duct tube 11 provides the necessary axial and lateral support for the fuel assembly. The duct tube 11 is thin walled and is formed with a thicker section, commonly referred to as a "load pad section" (not shown), intermediate the ends thereof to control lateral spacing between adjacent assemblies.

The connection assembly 13 of this invention includes an end member, hereinafter referred to as a "load pad housing" 15 releaseably attached to the upper end of duct tube 11. The load pad housing 15 comprises an elongated hollow body 16 having a thickened, enlarged formation 17, which along with the duct tube load pad section, determines the lateral spacing between adjacent fuel assemblies. The load pad housing 15 is provided with an axial bore defined by a generally annular, inner wall surface 18 and which is adapted to receive the handling socket 12.

An annular groove 20 is provided in the wall surface 18 for receiving an annular retaining ring, generally designated 21, therein. A generally rectangularly shaped cavity 22 is formed in the wall of groove 20 and defines a shoulder 23 for a purpose that will hereinafter become apparent. A helical thread formation 25 is provided along the inner wall surface of load pad housing 15 immediately below cavity 22 for threaded connection to the handling socket 12.

Figure 2:
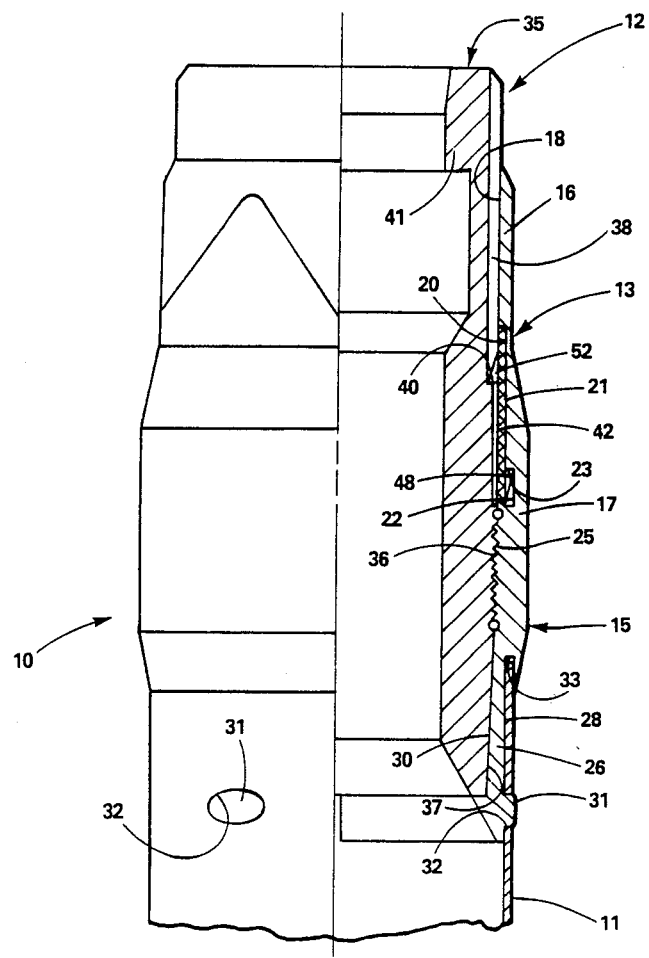
FIG. 2 is a fragmentary, partial longitudinal sectional view of the connection asembly shown in FIG. 1.

The lower end of load pad housing 15 terminates in a plurality of locking fingers 26 laterally spaced from each other by elongated slots 27 extending from the free or lower edge of the housing 15 upwardly toward but spaced from thread formation 25. As shown in FIG. 2, these fingers 26 have planar outer wall surfaces 28 and smooth, inner wall surfaces 30 which taper downwardly toward the free ends thereof. Each of the locking fingers 26 is provided with an embossment or pin 31 projecting radially outwardly from the outer wall surface 28 thereof for insertion into one of several openings 32 formed in the duct tube 11. The load pad housing 15 is formed with an annular notch 33 at the intersection of the lower end of formation 17 with the upper end of the fingers 26 for receiving the upper end of duct tube 11 in the assembled relation therewith as shown in FIG. 2.

The handling socket 12 comprises an elongated hollow body 35 having an external threaded portion 36 adapted to engage with the internal threaded formation 25 on load pad housing 15. The lower portion of body 35 below threaded portion 36 is provided with an outer tapered surface 37 (FIG. 2) complementary to the inner tapered surfaces 30 of fingers 26 for urging and maintaining the latter in a radially outwardly biased disposition.

The outer surface of body 35 is formed with an elongated groove 38 extending longitudinally from the top wall of body 35 and terminating in a shoulder 40 spaced above the threaded portion 36. An inturned flange 41 is provided at the upper end of body 35 to facilitate handling of the fuel assembly 10 by suitable grappling or handling apparatus.

Figure 3:
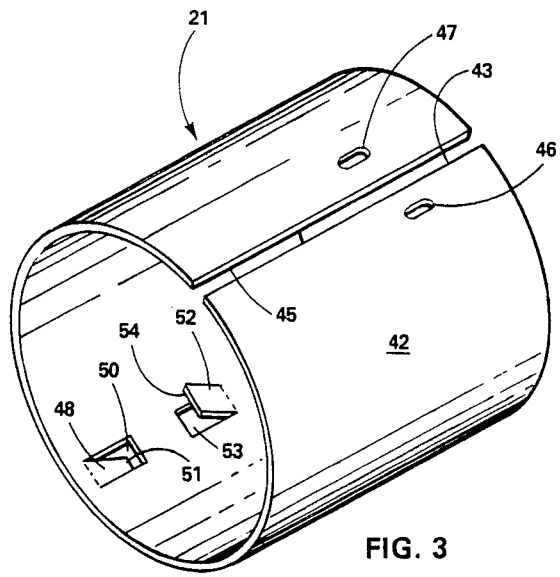
FIG. 3 is a perspective view of a retaining ring forming a part of the connection assembly of this invention.
Figure 4:
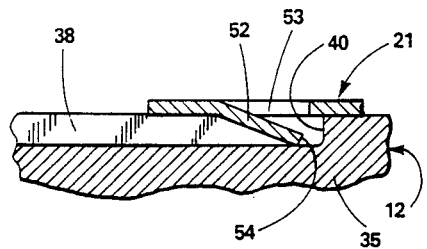
FIG. 4 is a fragmentary, sectional view, showing a preferred form of locking arrangement between two components of the connection assembly of this invention.

As best shown in FIG. 3, the retaining ring 21 of this invention comprises an annular body 42 split lengthwise or severed along a line parallel to the axis thereof to form spaced, opposed edges 43 and 45. This split arrangement enables the ring to be compressed or expanded radially to vary the diameter thereof. A pair of elongated openings 46 and 47 are formed in body 42 adjacent edges 43 and 45 for receiving an appropriate tool (not shown) facilitating insertion and removal of the ring 21 into and from the groove 20 of load pad housing 15.

A projection in the form of a locking tab 48 is struck out of the body 42 and is bent outwardly at an angle therefrom, leaving an opening 50 in body 42. As shown in FIG. 2, the outwardly disposed tab 48 is received in cavity 22 of load pad housing 15 with the transverse edge 51 thereof engagable with the shoulder 23 of load pad housing 15 to provide a locking connection therebetween. A depression in the form of a second locking tab 52, in spaced but longitudinal alignment with tab 48, also is struck out of the retaining ring body 42 and is bent inwardly at an angle therefrom, leaving an opening 53 therein. In the assembled relation (FIG. 2), this inwardly disposed tab 52 is received in groove 38 of the handling socket 12 to preclude rotation between the latter and ring 21 with the transverse edge 54 of tab 52 engagable with shoulder 40 to prevent axial upward displacement of the handling socket 12 relative to ring 21 and thereby withdrawal therefrom.

The tabs 48 and 52 are resiliently yieldable and are urged under pressure toward body 42 and into their respective openings 50 and 53 to facilitate assembly and disassembly of the connection assembly 13. However, the material from which the tabs 48 and 52 are composed is sufficiently resilient to urge them into their normal outward and inward sloping dispositions in their final assembled relation with the load pad housing 15 and handling socket 12. Accordingly, these tabs 48 and 52 can be repeatedly installed, disconnected, and subjected to impact forces during handling without being damaged sufficiently or otherwise permanently distorted to destroy their useful life.

Before attaching the handling socket 12 to the duct tube 11, the retaining ring 21 is radially compressed and inserted into the annular groove 20 formed along the inner wall surface of load pad housing 15. If necessary, the ring can be rotated relative to housing 15 until tab 48 is aligned with the cavity 22 and snaps into place therein, preventing both rotation and axial displacement of ring 21 relative to housing 15. Next, the handling socket 12 is inserted into the load pad housing 15 and threaded thereinto until it reaches the home position whereat the resiliently displaced locking tab 52 of ring 21 snaps inwardly into the handling socket groove 38 above shoulder 40. This prevents both handling socket rotation and axial removal from load pad housing 15.

In order to install this subassembly comprised of the handling socket 12, retaining ring 21 and load pad housing 15 into the duct tube 11, a key (not shown) in the form of an elongated bar can be inserted into groove 38 to cam the locking tab 52 toward and into its opening 53. The subassembly can then be attached to the duct tube 11 by inserting the locking fingers 26 into tube 11 with the upper end thereof being received in notch 33. The subassembly is rotated as required to position the pins 31 of locking fingers 26 in registry with the duct tube openings 32. The handling socket 12 is then further threaded into the load pad housing 15 causing the tapered surface 37 of socket 12 to urge the fingers 26 radially outwardly and firmly engage the pins 31 within their associated openings 32. The tapered surface 37 provides a radial force acting against the fingers to maintain the pins 31 in locking engagement within openings 32 and thereby precludes axial and rotational movement of the subassembly relative to the duct tube 11.

After installation, the key earlier placed in groove 38 can be axially withdrawn from the groove 38, allowing the resiliently displaced locking tab 52 to snap inwardly into such groove above the shoulder 40. Thus, all the components forming the connection assembly are mechanically interlocked to form a tight assembled connection preventing relative rotation and axial displacement between these several components.

In order to detach the handling socket assembly from duct tube 11, locking tab 52 is depressed into opening 53 by means of the heretofore mentioned key to displace the transverse edge 54 of tab 52 from above shoulder 40. With the locking tab 52 depressed, the handling socket 12 can then be easily threaded outwardly relative to load pad housing 15 to release the radial pressure of tapered surface 37 from fingers 26 and permit radial collapse of the latter to withdraw pins 31 inwardly from openings 32. The entire handling socket assembly can then be withdrawn axially from duct tube 11 and disassembled or dismantled by reversing the above described assembly operation.

While the form of locking tabs 48 and 52 shown are preferable, it should be appreciated that other locking arrangements can be employed to secure the retaining ring 21 and the handling socket 12 in place while preventing rotation or axial displacement of these components. For example, the metal of ring 21 can be upset, as by swaging, to form a protrusion and indentation adapted to be disposed in cavity 22 and groove 38, respectively, for mechanically locking the ring 21 to the housing 15 and the handling socket 12 to ring 21, respectively. Still other locking arrangements could be expected to occur to those skilled in the art.

From the foregoing, it is apparent that the objects of the present invention have been fully accomplished. As a result of this invention, an improved connection assembly is provided for easily attaching a handling socket to a fuel assembly duct tube to form a strong, rigid connection therebetween which can be easily and nondestructively dismantled for unobstructive access into the duct tube interior when desired. By the provision of a separate retaining ring having releaseable interlocks, relative movement or displacement between the several components forming the resulting assembly is precluded. The locking connection assembly of this invention not only facilitates quick and easy attachment and detachment of the handling socket to and from the fuel assembly duct tube 11, but also avoids the prior art weldments and the resultant shortcomings associated therewith.

The foregoing description of a preferred embodiment of this invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of this invention and its practical application to thereby enable others skilled in the art to utilize the invention in various embodiments and with various modifications as are suited to the particular use contemplated. It is intended that the scope of the invention be defined by the claims appended hereto.

We claim:

1. A connection for releasably attaching a socket member to a tube comprising: a tube defined by a wall provided with circumferentially spaced openings adjacent one end thereof, a housing having an internal thread formation and a plurality of laterally spaced fingers at one end thereof, said fingers having pins engagable within said tube openings, a socket member threadably received within said housing and having a tapered portion at one end thereof for urging said fingers radially outwardly, a split retaining ring interposed between said housing and said socket member and completely encapsulated therebetween, said ring having first locking means including means for releasably engaging said housing and second locking means including means for releasably engaging said socket member for securing said socket member, retaining ring, and housing in an interlocked assembled relation.

2. A locking connection according to claim 1, wherein said retaining ring comprises an annular body severed along a line parallel to the axis thereof to permit variance of the ring diameter.

3. A locking connection according to claim 2, wherein said releasably engaging means of said first locking means comprises a projection extending outwardly from the periphery of said annular body engagable within a cavity formed in said housing.

4. A locking connection according to claim 3, wherein said projection comprises a resiliently yieldable tab struck out from said annular body and extending outwardly at an angle from the periphery thereof.

5. A locking connection according to claim 2, wherein said releasably engaging means of said second locking means includes a depression extending inwardly from the periphery of said annular body engagable within a groove formed in said socket member.

6. A locking connection according to claim 5, wherein said depression comprises a resiliently yieldable tab struck out from said annular body and extending inwardly at an angle from the periphery thereof.

7. A locking connection according to claim 1, wherein said housing is formed with an internal cavity and said releasably engaging means of said first locking means includes a projection extending outwardly from said retaining ring for locking engagement within said cavity.

8. A locking connection according to claim 1, wherein said housing is formed with an annular notch for receiving the end portion of said tube.

9. A connection for releasably attaching a socket member to a tube comprising: a tube defined by a wall provided with circumferentially spaced openings adjacent one end thereof, a housing having an internal thread formation and a plurality of laterally spaced fingers at one end thereof, said fingers having pins engagable within said tube openings, a socket member threadably received within said housing and having a tapered portion at one end thereof for urging said fingers radially outwardly, a split retaining ring interposed between said housing said socket member and completely encapsulated therebetween, said ring including first locking means engagable with said housing and second locking means engagable with said socket member for rigidly securing said socket member, retaining ring, and housing in an interlocked relation, said socket member being formed with an elongated groove extending lengthwise along the periphery thereof and said locking means including a depression extending inwardly from said retaining ring for engagement within said groove to preclude relative rotation between said socket member and said ring.

10. A locking connection according to claim 9, wherein said groove terminates in a shoulder and said depression is provided with a portion engagable with said second shoulder to prevent axial displacement of said socket member relative to said ring.

* * * * *